United States Patent

[11] 3,553,367

[72] Inventors Bert F. Krauss
Westport, Conn.;
Bernard M. Rosenheck, Spring Valley, N.Y.

[21] Appl. No. 728,115
[22] Filed May 10, 1968
[45] Patented Jan. 5, 1971

[73] Assignee Litton Systems, Inc.
Beverly Hills, Calif.
a corporation of Maryland

[54] FACSIMILE MULTIPLEX COMMUNICATION SYSTEM
6 Claims, 4 Drawing Figs.

[52] U.S. Cl. .......... 178/50, 179/15, 332/17
[51] Int. Cl. .......... H04l 5/00
[50] Field of Search .......... 179/15MM, 15ST, 2DP; 178/5.6, 50, 61; 325/38(Cursory), 42(Cursory), 60(Cursory); 332/17, 21, 40

[56] References Cited

UNITED STATES PATENTS 3,160,812 12/1964 Scantlin .......... 325/30

*Primary Examiner*—Kathleen H. Claffy
*Assistant Examiner*—David L. Stewart
*Attorneys*—Alan C. Rose and Alfred B. Levine

ABSTRACT: A system for multiplexing facsimile transmission on an audio frequency carrier. The signals from a first transmitter are converted to serial digital data and used to synchronously amplitude modulate the carrier. The signals from a second transmitter are converted to serial digital data and used to synchronously phase modulate the amplitude modulated carrier. A first facsimile recorder responds to the amplitude modulated carrier. The phase modulation component is converted into an amplitude modulated signal to drive a second facsimile recorder.

PATENTED JAN 5 1971 3,553,367
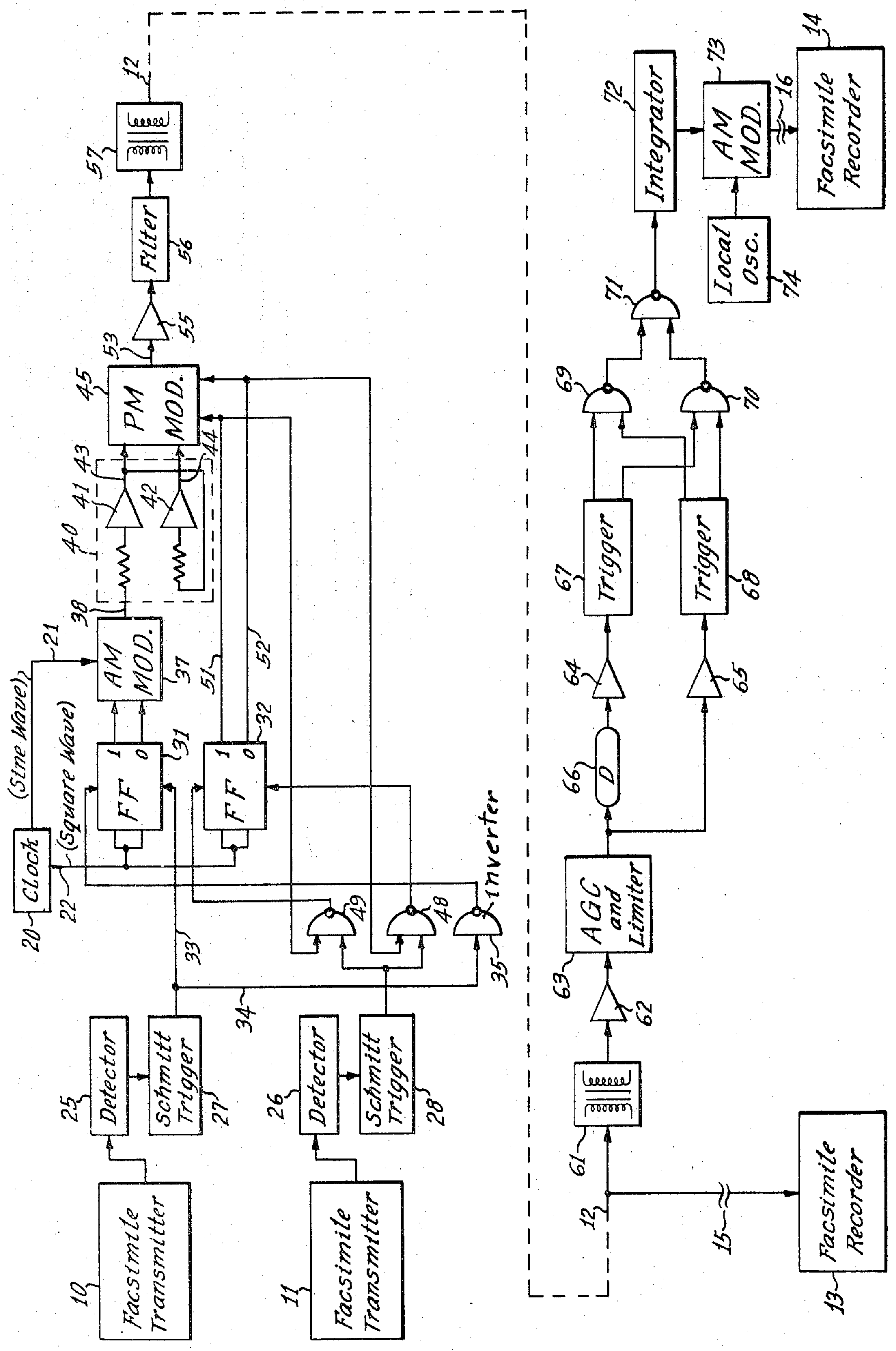

FACSIMILE MULTIPLEX COMMUNICATION SYSTEM

BACKGROUND OF THE INVENTION

1. Field of the Invention

Electrical communication systems, specifically multiplex telegraphy.

2. Description of the Prior Art

In prior systems involving simultaneous amplitude and phase modulation of a single carrier, complex circuit arrangements are necessary to eliminate crosstalk due to transients and to minimize signal distortion. In general, radio frequency carrier currents are utilized. For example, the patent to Scantlin, No. 3,160,812 describes a system employing voice transmission by amplitude modulation of a radio frequency carrier and asynchronous phase modulation of the carrier for transmitting a pulse code representing binary information. Systems for converting analogue signals into digital code signals are also known.

SUMMARY

The object of the invention is to multiplex a plurality of signals on a single carrier, utilizing digital code signals of the same frequency as the carrier frequency.

In its simplest form, input signals such as mark and space ("-black" and "white" facsimile) signals are converted into digital code pulses synchronized with the carrier. The signals from one transmitter amplitude modulate the carrier, and the signals from a second transmitter phase modulate the amplitude modulated carrier, i.e., shift the pulse phase 180° upon each transition from mark-to-space or space-to-mark condition. A conventional recorder responsive to amplitude modulated signals is connected directly to the carrier channel since it will not be affected by the phase modulation of the carrier. A second recorder for recording the signals from the second transmitter is connected to the carrier channel through a control unit which converts the phase modulated signals into a form adapted to drive the second recorder. Thus a conventional facsimile single-channel system may be changed in accordance with the invention into a two-channel system by the addition of simple digitizing and phase inverting components, thereby doubling the capacity of the system without the usual complicated filtering and signal conversion apparatus. Obviously the invention is not limited to the transmission of intelligence in the form of facsimile mark and space signals, nor to a phase shift of 180° for phase modulation. However, the important application of the invention is the transmission of analogue signals from a plurality of signal sources over an audio frequency channel, such as an ordinary facsimile or voice frequency channel.

BRIEF DESCRIPTION OF THE DRAWINGS

In the drawing, a typical composite or multiplex facsimile transmission system embodying the invention is shown in block diagram form.

DESCRIPTION OF THE PREFERRED EMBODIMENT

Referring to the drawing, a facsimile multiplex system is shown by way of example, consisting of two conventional facsimile transmitters 10 and 11 connected through a circuit or channel 12 to two facsimile recorders 13 and 14. For purposes of explanation, it is assumed that the transmitters generate amplitude modulated signals of two discrete levels, and the channel 12 is an audiofrequency or voice channel of the kind widely used in facsimile communications. The amplitude modulated signals from transmitters 10 and 11 are transmitted simultaneously over the channel 12 by multiplexing the signals in accordance with the invention, thereby doubling the channel capacity. As shown, the output signals from both transmitters are converted into digital code signals timed by a clock or source of frequency that is synchronized with the carrier frequency of channel 12. The carrier is synchronously amplitude modulated in accordance with the signals from transmitter 10 and then synchronously phase modulated in accordance with the signals from transmitter 11. In this manner, both facsimile signals may be transmitted simultaneously without crosstalk between the channels due to transients in the output waveforms. It should be noted that the recorders 13 and 14 need not be located at the same point or at the station where the demultiplexing equipment is located, as indicated by the symbols 15 and 16.

In the transmitting system, a source of constant frequency 20 designated as a "clock" supplies a sine wave carrier on conductor 21 and a square wave timing current on conductor 22, which is of the same frequency and is in phase with the alternating carrier on the conductor 21. The amplitude modulated signals from transmitters 10 and 11 are detected by conventional AM detectors 25 and 26, respectively. The outputs of the detectors are used to trigger a threshold circuit such as a Schmitt trigger or equivalent, which determines if the signal level of the facsimile signals corresponds to black or white (minimum or maximum respectively, sometimes termed "-mark" and "space" signals.) The outputs of the trigger circuits 27 and 28 are fed into flip-flops 31 and 32 respectively, which operate at a synchronous rate by reason of the connection to the clock 22. In this manner the flip-flops are operated synchronously with the wave frequency of the carrier on which the amplitude and phase modulated signals are to be applied. The carrier frequency may be for example, 2400 cycles per second.

The output of the Schmitt trigger 27 is connected through conductor 33 to one terminal of the flip-flop 31 and through conductor 34 and an inverter 35 to the other terminal of the flip-flop. Thus the output of the flip-flop 31 consists of amplitude modulation switching signals synchronized with the reversals of the carrier wave and by means of the AM modulator 37 are converted into AM signals in the output conductor 38.

In the system shown by way of example, the amplitude modulated signal is connected to an inverting amplifier unit 40 consisting of amplifiers 41 and 42 connected to produce signal outputs in the conductors 43 and 44 which are 180° out-of-phase. The amplifiers 41 and 42 are adjusted to produce output signals of equal amplitude which are impressed upon a PM modulator 45.

The output of Schmitt trigger 28 associated with the second facsimile transmitter 11 is connected to flip-flop 32 through NAND gates 48 and 49. Since the flip-flop 32 is also connected to the clock pulses on conductor 22, the output pulses from the flip-flop 32 are synchronized with the carrier waves and are also impressed through the conductors 51 and 52 upon the PM modulator 45 to switch either of the two phases of the AM carrier to the output conductor 53. The flip-flop 32 and the gates 48 and 49 cause the phase to change on each clock pulse whenever the black level is being scanned by the transmitter 11 and cause the phase to remain constant whenever the white level is being scanned. In this manner the amplitude modulated carrier is synchronously modulated in phase in accordance with the facsimile signal in transmitter 11. While the phase shift is 180°, a different phase shift may be used if desired. The phase and amplitude modulated signals in conductor 53, as shown, are impressed upon the line circuit 12 through an amplifier 55, filter 56 to eliminate high frequency components, and an isolation transformer 57. The output signal to a line 12 therefore is a two-level two-phase signal in which the amplitude modulation contains the intelligence from transmitter 10 and the phase modulation contains the intelligence from transmitter 11.

At the receiving station it is assumed for purposes of explanation that facsimile recorders 13 and 14 of the conventional type which respond to an amplitude modulated carrier are used. The recorder 13 is shown as connected directly to the line circuit 12 through any suitable circuit or channel. No intermediate converting or auxiliary equipment is required since the recorder does not respond to phase modulated signals. The AM/PM signals from the line, are also impressed upon a converting or demultiplexing system which will convert the phase modulated signal component to an amplitude modulated signal for driving the second recorder 14. As shown in the drawing, the phase converter system comprises an isolation transformer 61, an amplifier 62, an automatic gain control and limiter 63, two amplifiers 64 and 65 one of which is connected in circuit through a delay line 66, Schmitt trigger circuits 67 and 68, NAND gates 69, 70 and 71 which compare the delayed and undelayed signals from amplifiers 64 and 65 to determine if they are of the same or opposite phase representing black and white signals respectively (1 or 0 code). An integrator 72 is interposed between the phase converting circuit and the amplitude modulator 73 to remove noise spikes from the signal. The free running local oscillator 74 and AM modulator 73 are used in a conventional arrangement to convert the baseband signal out of the integrator to amplitude modulation for driving the facsimile recorder 14.

The improved system according to the invention has the obvious advantages of simplicity and reliability. The second channel, described in this instance as embodying phase modulation, may be readily incorporated into an existing system having the usual amplitude modulation type of transmitter and receiver, thereby doubling the channel capacity. While the phase modulation may involve pulse reversal or 180° phase shift as explained, a different phase shift or other types of modulation techniques will be useful in certain applications. Accordingly the invention is not limited to the system shown and described in detail for the purpose of explaining the underlying principles thereof.

We claim:

1. A multiplex system utilizing an alternating carrier, comprising:

two transmitters;

two receivers controlled by said carrier;

means for converting the intelligence signals from both of said transmitters into digital code signals synchronized in frequency and phase with the waves of said carrier;

means including said converting means for synchronously amplitude modulating said carrier in accordance with the intelligence signals from one of said transmitters;

means including said converting means for synchronously phase modulating said carrier in accordance with the intelligence signals from the other of said transmitters, and a transmission circuit for the carrier which connects the transmitters and receivers, whereby each receiver is responsive to the modulation of said carrier representing the intelligence signals generated by its corresponding transmitter.

2. A multiplex system according to claim 1, in which one receiver responding to amplitude modulated input signals is connected directly to the transmission circuit.

3. A multiplex system according to claim 2, in which the second receiver is connected to said transmission circuit through demultiplexing means for converting phase modulated to amplitude modulated signals.

4. A multiplex system according to claim 1, in which said receivers are facsimile recorders of the amplitude modulated signal type.

5. A multiplex system according to claim 1, in which the code signal converting means includes a flip-flop cyclically operated in synchronism with the carrier wave reversals.

6. A multiplex facsimile system comprising:

means for generating an alternating carrier;

a transmitting channel for said carrier;

a plurality of facsimile transmitters;

a plurality of facsimile recorders, one for each of said transmitters;

means for converting the intelligence signals generated by each of said transmitters into synchronous digital code signals of the same frequency and phase as the waves of said alternating carrier;

means connected to said code converting means for modulating said carrier in a different manner for the intelligence signals from each of the respective transmitters; and means responsive to the modulated carrier for driving each of said recorders in accordance with the operation of different ones of said transmitters.